United States Patent
Yamazaki et al.

(10) Patent No.: US 12,050,731 B2
(45) Date of Patent: Jul. 30, 2024

(54) INFORMATION PROCESSING SYSTEM, INFORMATION PROCESSING APPARATUS, RECORDING MEDIUM, AND CONTROL METHOD

(71) Applicant: Lenovo (Singapore) Pte. Ltd., Singapore (SG)

(72) Inventors: Mitsuhiro Yamazaki, Kanagawa (JP); Keiichi Yoshitomi, Kanagawa (JP); Yoshitsugu Suzuki, Kanagawa (JP); Kazunori Yamamura, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/448,170

(22) Filed: Aug. 11, 2023

(65) Prior Publication Data
US 2024/0094820 A1    Mar. 21, 2024

(30) Foreign Application Priority Data
Sep. 21, 2022  (JP) ................................ 2022-150232

(51) Int. Cl.
*G06F 3/01* (2006.01)
*G06F 3/0354* (2013.01)
*G06F 3/041* (2006.01)
*G06F 3/16* (2006.01)

(52) U.S. Cl.
CPC .......... *G06F 3/016* (2013.01); *G06F 3/03545* (2013.01); *G06F 3/0416* (2013.01); *G06F 3/167* (2013.01)

(58) Field of Classification Search
CPC .... G06F 3/016; G06F 3/03545; G06F 3/0416; G06F 3/167
See application file for complete search history.

(56) References Cited

U.S. PATENT DOCUMENTS

| 9,383,839 | B1 * | 7/2016 | Rost ..................... G06F 3/03545 |
| 9,575,575 | B2 * | 2/2017 | Nicholson ............. G06F 3/0383 |
| 10,042,439 | B2 * | 8/2018 | Varlamov ........... G06F 3/03545 |
| 10,268,273 | B1 * | 4/2019 | Sundaram ............. G06F 3/0346 |

(Continued)

FOREIGN PATENT DOCUMENTS

| JP | 2016-528654 A | 9/2016 |
| JP | 2017-537395 A | 12/2017 |

(Continued)

*Primary Examiner* — Benyam Ketema
(74) *Attorney, Agent, or Firm* — Osha Bergman Watanabe & Burton LLP

(57) ABSTRACT

An information processing system includes an information processing apparatus and an input device, where the input device includes a vibrating unit, the information processing apparatus includes a touch sensor and a display unit, and the touch sensor and the display unit are superimposed on each other. A controller of the information processing apparatus or the input device monitors input operation of the input device to the touch sensor to enable a sound mode when detecting a sound output request, and to enable a vibration mode when detecting the input operation, the sound mode is a drive mode to cause the vibrating unit to present sound, and the vibration mode is a drive mode to vibrate the vibrating unit in response to contact of the input device with the touch sensor.

8 Claims, 7 Drawing Sheets

(56) References Cited

U.S. PATENT DOCUMENTS

| | | | |
|---|---|---|---|
| 10,725,544 B1* | 7/2020 | Taylor | G06F 3/041 |
| 2001/0050677 A1* | 12/2001 | Tosaya | G06F 3/043 |
| | | | 345/173 |
| 2002/0079371 A1* | 6/2002 | Bobrow | G06F 3/03546 |
| | | | 358/478 |
| 2003/0174121 A1* | 9/2003 | Poupyrev | G06F 3/04886 |
| | | | 345/156 |
| 2009/0079703 A1* | 3/2009 | Kyung | G06F 3/03545 |
| | | | 345/173 |
| 2009/0127006 A1* | 5/2009 | Lynggaard | G06F 3/03545 |
| | | | 178/19.01 |
| 2010/0090815 A1* | 4/2010 | Yamaya | G06F 3/016 |
| | | | 345/173 |
| 2010/0194547 A1* | 8/2010 | Terrell | A63F 13/24 |
| | | | 340/407.1 |
| 2011/0116345 A1* | 5/2011 | Miyamoto | G06F 3/03545 |
| | | | 367/127 |
| 2012/0182232 A1* | 7/2012 | Saito | G06T 1/00 |
| | | | 345/173 |
| 2014/0028592 A1* | 1/2014 | Wang | G06F 3/016 |
| | | | 345/173 |
| 2014/0210781 A1* | 7/2014 | Stern | G06F 1/3262 |
| | | | 345/174 |
| 2014/0245139 A1 | 8/2014 | Lee et al. | |
| 2014/0253469 A1* | 9/2014 | Hicks | G06F 3/03545 |
| | | | 345/173 |
| 2014/0340326 A1* | 11/2014 | Kameyama | G06F 3/03545 |
| | | | 345/173 |
| 2014/0340328 A1* | 11/2014 | Kameyama | G06F 3/03545 |
| | | | 345/173 |
| 2015/0002457 A1* | 1/2015 | Woo | G06F 3/03545 |
| | | | 345/174 |
| 2016/0034055 A1* | 2/2016 | Utykanski | G06F 3/03543 |
| | | | 235/462.13 |
| 2016/0044422 A1* | 2/2016 | Aurongzeb | G06F 3/038 |
| | | | 345/179 |
| 2016/0364091 A1* | 12/2016 | Bernstein | G06F 3/0482 |
| 2017/0285774 A1* | 10/2017 | Parikh | G06F 3/167 |
| 2018/0364813 A1* | 12/2018 | Sayah | G06F 3/0346 |
| 2019/0122017 A1* | 4/2019 | Atkinson | G06F 3/03545 |
| 2021/0294441 A1* | 9/2021 | Sung | G06F 3/0354 |

FOREIGN PATENT DOCUMENTS

| | | |
|---|---|---|
| WO | 2008/078523 A1 | 7/2008 |
| WO | 2016/094103 A1 | 6/2016 |

* cited by examiner

INFORMATION PROCESSING SYSTEM, INFORMATION PROCESSING APPARATUS, RECORDING MEDIUM, AND CONTROL METHOD

CROSS-REFERENCE TO RELATED APPLICATIONS

This application claims priority to Japanese Patent Application No. 2022-150232 filed on Sep. 21, 2022, the contents of which are hereby incorporated herein by reference in their entirety.

BACKGROUND

Technical Field

The present invention relates to an information processing system, an information processing apparatus, a recording medium storing a program, and a control method, which, for example, relates to control of an input device having a tactile presentation function.

Description of Related Art

A digital pen is an input device, which is also called an electronic pen, a smart pen, a stylus, or the like. The digital pen may be used to display and record handwriting characters, figures, and the like on and in an information processing apparatus. For example, a tablet terminal or a personal computer (PC) compatible with the digital pen may be often used for recording memos. Therefore, a digital pen having a haptic feedback function is proposed to improve the feeling of use. The digital pen having the haptic feedback function is also called a haptic pen.

For example, in Japanese Unexamined Patent Application Publication (Translation of PCT Application) No. 2017-537395, there is disclosed an interactive stylus including a stylus body having a first end, where the first end is configured to provide a first function and a second function when used by a user. The interactive stylus further includes a controller configured to drive the first end to capacitively couple the first end with an electrode matrix of an interactive display device. The capacitive coupling is associated with the first function, and the second function is disabled in response to automatically sensing a user's intent to use the first function without any explicit user input. The interactive stylus is included in the stylus body, and further has a haptic actuator associated with the second function. Disabling the second function includes the meaning of preventing the operation of the haptic actuator.

On the other hand, an information processing apparatus may be used to acquire various information from web servers via networks. Such a case where the pieces of information provided from the web servers have a format as video accompanied with audio is increasing. In a quiet environment such as at a meeting, a lecture, or an office, a user using the information processing apparatus may want to confirm the provided information without emitting sound as much as possible. Use of an audio device such as a headphone or an earphone is considered to avoid sound emission to the surroundings.

However, the user may not always have the audio device. Even when the user has the audio device, the audio device may not be connected to the body of the information processing apparatus when the user needs to use the audio device. Therefore, this may not lead to improve convenience for the user.

SUMMARY

The present invention has been made to solve the above problem, and an information processing system according to the first aspect of the present invention includes an information processing apparatus and an input device, where the input device includes a vibrating unit, the information processing apparatus includes a touch sensor and a display unit, and the touch sensor and the display unit are superimposed on each other, wherein a controller of the information processing apparatus or the input device monitors input operation of the input device to the touch sensor to enable a sound mode when detecting a sound output request, and to enable a vibration mode when detecting the input operation, the sound mode is a drive mode to cause the vibrating unit to present sound, and the vibration mode is a drive mode to vibrate the vibrating unit in response to contact of the input device with the touch sensor.

The above information processing system may be such that the controller detects, as the sound output request, a sound setting for the input device.

The above information processing system may also be such that the controller disables the sound mode when the input operation is not detected continuously for a certain amount of time and when a sound signal is not supplied to the vibrating unit.

The above information processing system may further be such that the controller enables the sound mode when detecting the sound output request without detecting the input operation, and the controller disables the sound mode when detecting the input operation.

Further, the above information processing system may be such that the input device further includes a contact detection unit to detect contact, and the controller switches the activation of the sound mode when the contact is detected.

An information processing apparatus according to the second aspect of the present invention includes a controller, a touch sensor, and a display unit, where the touch sensor and the display unit are superimposed on each other, wherein the controller monitors input operation of an input device to the touch sensor to enable a sound mode when detecting a sound output request, and to enable a vibration mode when detecting the input operation, the sound mode is a drive mode to cause a vibrating unit of the input device to present sound, and the vibration mode is a drive mode to vibrate the vibrating unit in response to contact of the input device with the touch sensor.

A non-transitory computer-readable recording medium storing a program according to the third aspect of the present invention, the program causing a computer to function as the information processing apparatus mentioned above.

A control method according to the fourth aspect of the present invention is a control method for an information processing system including an information processing apparatus and an input device, the input device includes a vibrating unit, the information processing apparatus includes a touch sensor and a display unit, and the touch sensor and the display unit are superimposed on each other, the control method including: a step of causing a controller of the information processing apparatus or the input device to monitor input operation of the input device to the touch sensor; and a step of causing the controller to enable a sound mode when detecting a sound output request, and to enable a vibration mode when detecting the input operation, wherein the sound mode is a drive mode to cause the vibrating unit to present sound, and the vibration mode is a drive mode to vibrate the vibrating unit in response to contact of the input device with the touch sensor.

According to the above-described aspects of the present invention, since sound is presented from the vibrating unit, convenience can be improved.

DETAILED DESCRIPTION

Figure 1:
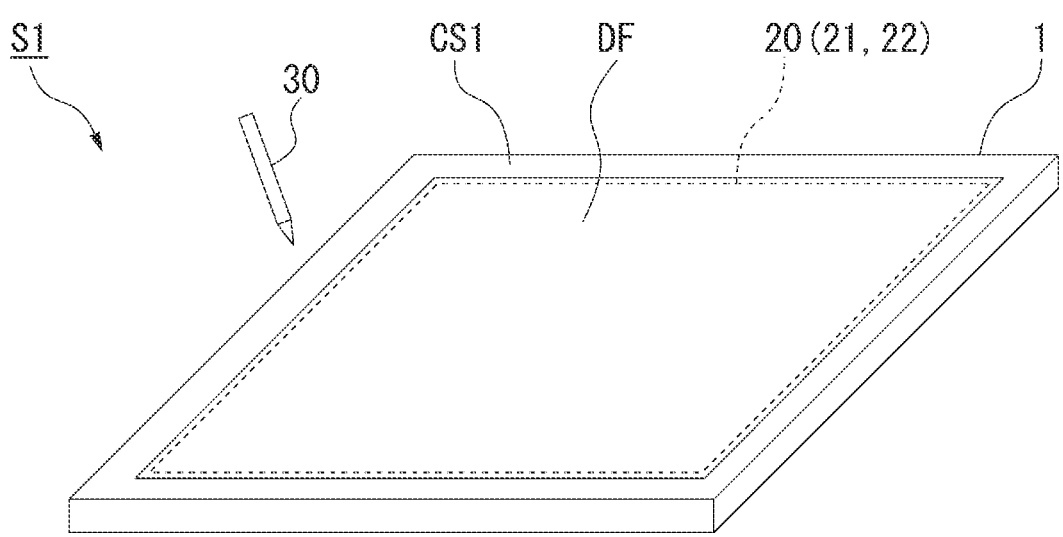
FIG. 1 is a perspective view illustrating an appearance configuration example of an information processing system according to the present embodiment.

An embodiment of the present invention will be described below with reference to the accompanying drawings. First, an appearance configuration example of an information processing system S1 according to the present embodiment will be described. In the following, such a case that an information processing apparatus 1 is a tablet terminal and an input device 30 is a digital pen having a tactile presentation function will be mainly described. The digital pen is a pen-shaped operating medium. In the present application, the digital pen may be simply called a "pen." FIG. 1 is a perspective view illustrating an appearance configuration example of the information processing system S1 according to the present embodiment. The information processing system S1 includes the information processing apparatus 1 and the input device 30.

The information processing apparatus 1 has a flat shape with a thin thickness compared to the width and the height. The information processing apparatus 1 has a chassis CS1 and a touch screen 20 on one main surface of the chassis CS1 (which may be called the "surface" in the following description). The touch screen 20 covers the surface of the chassis CS1. The outer periphery of the touch screen 20 is supported to be surrounded by the chassis CS1. In the chassis CS1, other members of the information processing apparatus 1 are housed.

The input device 30 is held by a user and moved while approaching or touching the surface of the touch screen 20, thus being used for data input or editing of characters, symbols, figures, and the like. The touch screen 20 includes a display unit 21 and a touch sensor 22 (to be described later). The display unit 21 visibly displays various information on a display screen DF placed on the surface thereof.

The touch sensor 22 is superimposed on the surface of the display unit 21. The touch sensor 22 detects input operation of the input device 30 on the surface thereof. The information processing apparatus 1 monitors the presence or absence of input operation, and when input operation is detected, the information processing apparatus 1 executes data input or editing based on the input operation. For example, the information processing apparatus 1 displays, on the display screen DF, a trajectory of touch positions on the touch sensor 22.

The input device 30 includes a vibrating unit 55 (to be described later). The information processing apparatus 1 controls the drive mode of the vibrating unit 55. As the drive mode, there are at least a sound mode and a vibration mode. The sound mode is a drive mode to cause the vibrating unit 55 to play back sound. The vibration mode is a drive mode to vibrate the vibrating unit 55 in response to contact of the input device 30 with the touch sensor 22. When detecting a sound output request, the information processing apparatus 1 enables the sound mode, while when detecting input operation, the information processing apparatus 1 enables the vibration mode. Here, the verb "enable" means to make the mode executable or usable. On the other hand, the verb "disable" means to make the mode non-executable or unusable.

For example, as the sound output request, the information processing apparatus 1 detects a sound playback setting or a sound playback instruction to the input device 30. When the sound mode is enabled, the information processing apparatus 1 outputs, to the vibrating unit 55, a drive signal including a sound signal. The vibrating unit 55 presents sound according to the input drive signal. When the vibration mode is enabled, the information processing apparatus 1 outputs, to the vibrating unit 55, a drive signal including a vibration signal. The vibrating unit 55 vibrates according to the input drive signal. This vibration is presented to the user as a tactile stimulation.

Figure 2:
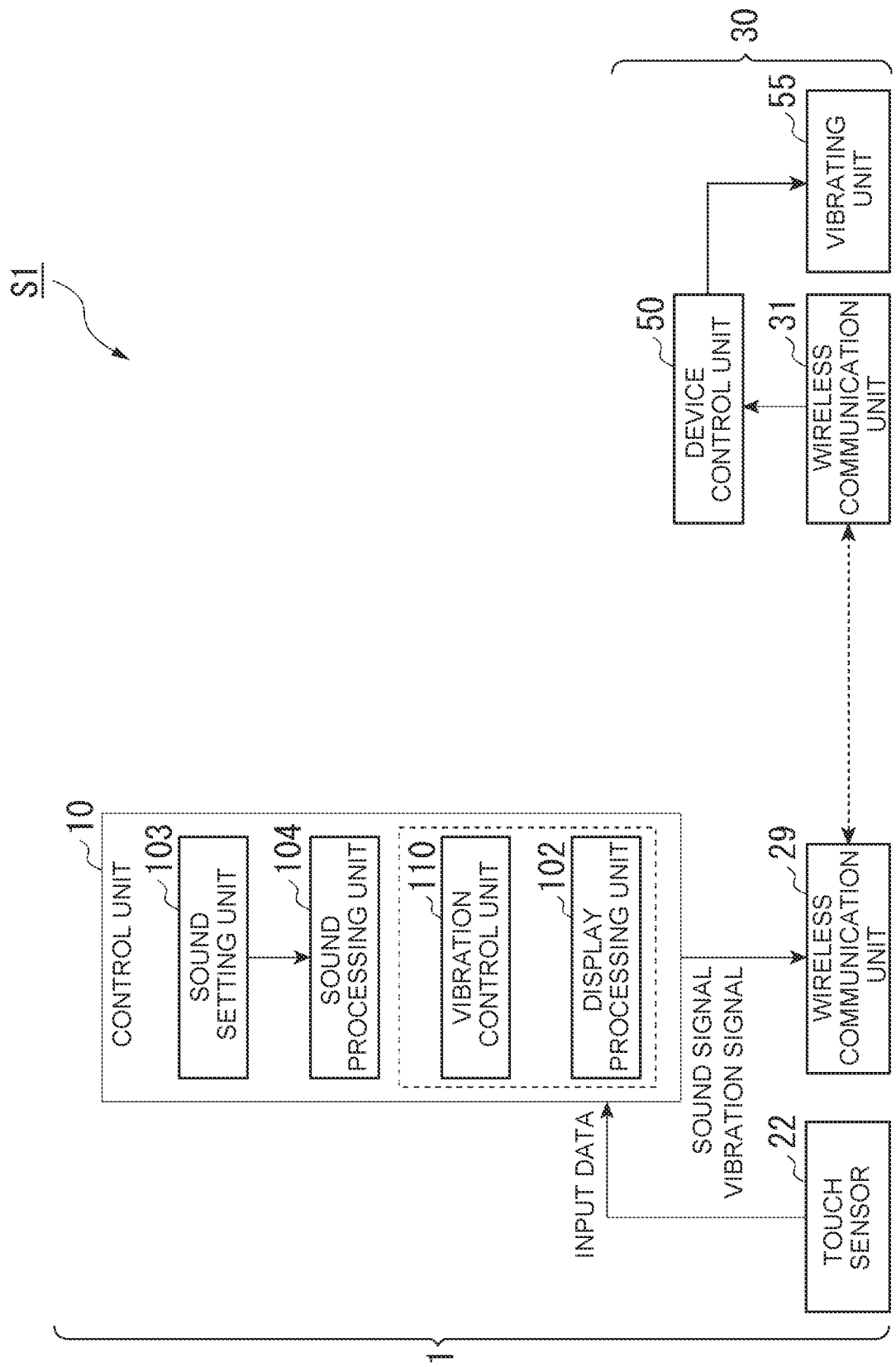
FIG. 2 is a block diagram illustrating a schematic configuration example of the information processing system according to the present embodiment.

Next, a schematic configuration example of the information processing system S1 according to the present embodiment will be described. FIG. 2 is a block diagram illustrating the schematic configuration example of the information processing system S1 according to the present embodiment. The information processing system S1 includes the information processing apparatus 1 and the input device 30.

The information processing apparatus 1 includes a control unit 10, the touch sensor 22, and a wireless communication unit 29. The touch sensor 22 detects a touch on the display screen DF or approach (hovering) within a certain distance to the display screen DF as input operation of the input device 30, and identifies the position. The touch sensor 22 generates input data including detection information indicative of the detected touch or approach, and the position thereof, and outputs the generated input data to the control unit 10. The touch sensor 22 may detect, as a contact pressure, a pressure at a touch position in contact with the input device 30, include information of the detected contact pressure in input data, and output the input data to the control unit 10. The touch sensor 22 may also detect, as a pen angle, an angle of the longitudinal direction of the input device 30 with respect to the display screen DF. The touch sensor 22 may include information of the detected pen angle in input data and output the input data to the control unit 10. The detection of the approach to the display screen DF and the detection of the pen angle will be described later.

The control unit 10 controls the overall functionality of the information processing apparatus 1. The control unit 10 includes a display processing unit 102, a sound setting unit 103, a sound processing unit 104, and a vibration control unit 110.

For example, the sound setting unit 103 displays a sound setting screen (not illustrated) as the display screen DF (FIG. 1) of the display unit 21. The sound setting screen is a screen for setting a presentation device to present sound, and the volume of the presentation device. The sound setting screen is connected to the own unit to display presentable devices that allow sounds to be presented, on which screen components to give an instruction of a volume adjustment amount for each presentable device are disposed. The volume adjustment amount corresponds to a gain for a sound signal.

For example, the sound setting unit 103 selects any one of the presentable devices as a presentation device based on the input data from the touch sensor 22, and sets a volume adjustment amount for the presentation device. The sound setting unit 103 outputs, to the sound processing unit 104 and the vibration control unit 110, sound setting information indicative of the selected presentation device and the volume adjustment amount. As the presentable devices, a speaker 26 (to be described later) and the input device 30 are included. In the following, such a case that the input device 30 is selected as the presentation device will be mainly described.

For example, the functionality of the sound setting unit 103 can be implemented by executing a device setting API (Application Programming Interface) function of an operating system (OS). The functionality of the sound setting unit 103 may be implemented by calling the API function according to an application program (which may also be called an "app" in the present application). Further, in the present application, the execution of a program also includes the meaning of the execution of processing instructed by various commands written in the program.

When sound presentation is instructed, the sound processing unit 104 acquires a sound signal. For example, the sound presentation can be instructed by input data indicative of pressing of an audio play button from the touch sensor 22. The sound processing unit 104 may acquire the sound signal using any one of the following techniques, namely: input of a sound signal from the outside of the information processing apparatus 1; reading of a prestored sound signal; sound signal synthesis; and the like. The sound processing unit 104 may also be implemented as part of the functionality of the app pertaining to the sound setting unit 103. For example, the app concerned may be any one of a voice call app, a record/playback app, a sound synthesis app, a sound streaming app, and the like.

The sound setting information is input from the sound setting unit 103 to the sound processing unit 104. The sound processing unit 104 adjusts the volume of the sound signal acquired by the volume adjustment amount instructed by the sound setting information. The sound processing unit 104 outputs a sound signal after the volume is adjusted to the presentation device instructed by the sound setting information. When the input device 30 is instructed as the presentation device, the sound processing unit 104 outputs the sound signal after the volume is adjusted to the vibration control unit 110.

The display processing unit 102 performs data input or editing according to input operation instructed by input data from the touch sensor 22. For example, the display processing unit 102 identifies respective contact positions instructed by input data input at regular intervals and forms a time series of contact positions. The display processing unit 102 generates and displays, on the display unit 21, a movement trajectory based on the formed time series of contact positions.

The vibration control unit 110 monitors the presence or absence of input of input data indicative of input operation from the touch sensor 22, and the presence or absence of input of the sound setting information from the sound setting unit 103. Based on the input data and the sound setting information, the vibration control unit 110 controls the drive mode of the vibrating unit 55 of the input device 30.

When input data related to the approach or contact of the input device 30 to or with the touch sensor 22 is input, the vibration control unit 110 can determine that the input operation is detected. The vibration control unit 110 determines the vibration mode of the vibrating unit 55 to be the drive mode when the input operation is detected.

When the sound setting information indicative of the input device 30 as the presentation device or the sound volume for the input device 30 is input, the vibration control unit 110 can determine that the sound output request is made as the drive mode of the vibrating unit 55. This is because a user's intent for sound playback is indicated by the input of the sound setting information.

When no input operation is detected but when the sound output request is detected, the vibration control unit 110 determines the drive mode of the vibrating unit 55 to be the sound mode. However, when no input operation is detected for a certain amount of time (for example, 30 seconds to 3 minutes) and when no sound signal is output to the vibrating unit 55, the vibration control unit 110 may change the drive mode from the sound mode to the vibration mode.

When input operation is detected, the vibration control unit 110 acquires a vibration signal to vibrate the vibrating unit 55. The vibration control unit 110 may read a vibration signal indicative of a preset reference waveform, or may receive input of a vibration signal from an external device. The vibration control unit 110 may make an adjustment to increase the amplitude of the vibration signal as a moving speed of contact positions indicated in the input data is higher. Further, the vibration control unit 110 may make an adjustment to increase the amplitude of the vibration signal as the contact pressure of the input device 30 with the touch sensor 22 is higher.

The vibration control unit 110 determines a drive signal to drive the vibrating unit 55 according to the determined drive mode. When the drive mode is the sound mode, the vibration control unit 110 selects the sound signal input from the sound processing unit 104 as the drive signal. When the drive mode is the vibration mode, the vibration control unit 110 selects a vibration signal generated in the own unit as the drive signal.

The vibration control unit 110 transmits the selected drive signal to the input device 30 via the wireless communication unit 29. The transmitted drive signal is supplied to the vibrating unit 55.

The wireless communication unit 29 wirelessly transmits and receives various data to and from the input device 30 using a predetermined communication system.

Next, a schematic configuration example of the input device 30 will be described. The input device 30 includes a wireless communication unit 31, a device control unit 50, and the vibrating unit 55.

The wireless communication unit 31 uses a predetermined communication system to transmit and receive various data wirelessly to and from the information processing apparatus 1.

The device control unit 50 centrally controls the functionality of the input device 30. For example, the device control unit 50 receives a drive signal from the information processing apparatus 1 using the wireless communication unit 31. The device control unit 50 outputs the received drive signal to the vibrating unit 55.

The vibrating unit 55 vibrates according to the drive signal input from the device control unit 50. The vibration of the vibrating unit 55 generates sound waves to be presented as sound.

In general, a human audible range is about 20 Hz to 20 kHz, and the sensitivity in a band of 500 Hz to 2 kHz is higher than the sensitivity in the other frequency bands. The sensitivity decreases in a lower frequency band as the frequency decreases. In contrast, in terms of the sense of human touch, the sensitivity in a band of 10 to 100 Hz is higher than the sensitivity in the other frequency bands. The sensitivity decreases in a higher frequency band as the frequency increases. Vibration at frequencies of 500 Hz or more is barely perceived. The vibration signal as the drive signal is mainly composed of low-frequency components of about 200 Hz or less. In contrast, the sound signal is mainly composed of high-frequency components of about 200 Hz or more.

Figure 3:
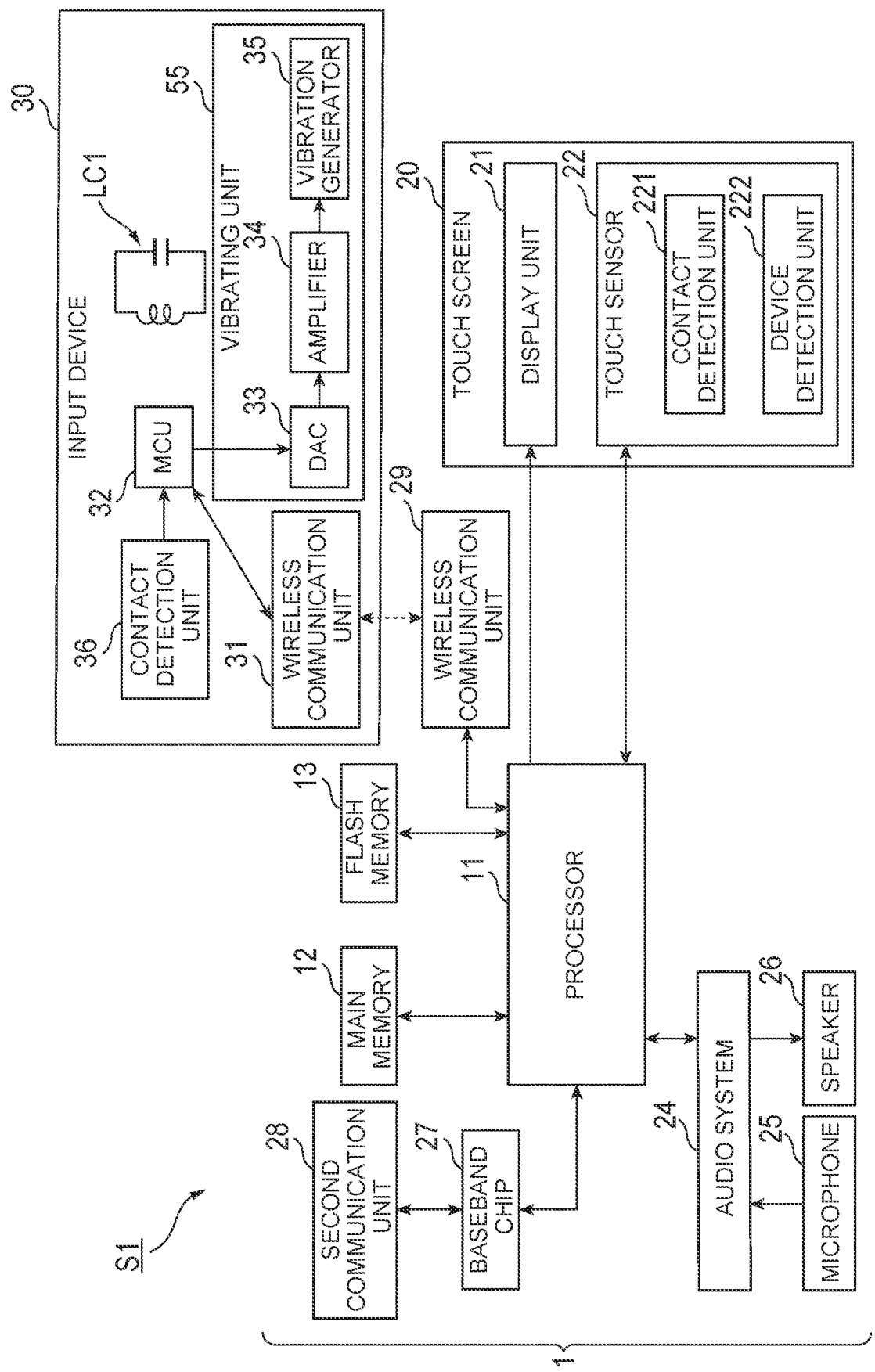
FIG. 3 is a block diagram illustrating a hardware configuration example of the information processing system according to the present embodiment.

Next, a hardware configuration example of the information processing system S1 according to the present embodiment will be described. FIG. 3 is a block diagram illustrating the hardware configuration example of the information processing system S1 according to the present embodiment. The information processing system S1 includes the information processing apparatus 1 and the input device 30. The information processing apparatus 1 includes a processor 11, a main memory 12, a flash memory 13, the touch screen 20, an audio system 24, a microphone 25, the speaker 26, a baseband chip 27, a second communication unit 28, and the wireless communication unit 29.

The processor 11 controls the overall functionality of the information processing apparatus 1. As the processor 11, for example, one or more CPUs (Central Processing Units) are applied. The processor 11 executes a predetermined program to function as the control unit 10 in collaboration with the main memory 12 and other hardware.

The main memory 12 is a writable memory used as a working area of the processor 11, that is, used as a reading area of execution programs and various setting data, and a writing area of processed data acquired by executing the programs. The main memory 12 is composed, for example, of plural DRAM (Dynamic Random Access Memory) chips. The execution programs include the OS, various drivers for controlling peripheral devices, and the like, various services/utilities, apps, and the like.

In the flash memory 13, the OS, various drivers, various services/utilities, apps, and various data are prestored.

The display unit 21 displays various display screens based on display data output from the processor 11. The display unit 21 may be, for example, either a liquid crystal display, an organic electro-luminance display, or the like.

The touch sensor 22 includes a contact detection unit 221 and a device detection unit 222.

The contact detection unit 221 detects an object (mainly the input device 30 in the present application) in contact with the display screen DF and the contact position thereof. The contact detection unit 221 detects the contact pressure of the object in contact with the display screen DF. The contact detection unit 221 is, for example, a capacitive pressure sensor. The contact detection unit 221 may also detect a tilt of the object in contact with the touch sensor 22, that is, a pen angle. When the contact detection unit 221 is a three-axis pressure sensor, the pen angle can be identified by using directional cosines for the pressure in respective axial directions.

The device detection unit 222 detects the input device 30 that has approached though not in contact with the own unit, and the position thereof as an approach position. The device detection unit 222 includes, for example, an electromagnetic induction sensor. The electromagnetic induction sensor detects an AC-induced magnetic field generated in a resonant circuit LC1 (to be described later) by the approach of the input device 30. The electromagnetic induction sensor can detect the presence or absence of the approach of the input device 30 based on whether or not such a position that the magnitude of the magnetic field detected at the resonance frequency exceeds a certain value exists. The electromagnetic induction sensor can identify, as the approach position of the input device 30, the position at which the detected magnitude of the magnetic field exceeds the certain value.

The audio system 24 performs processing on the sound signal, that is, processing to input, output, record, play back, encode, decode the sound signal, and the like. For example, the audio system 24 includes an audio IC (Integrated Circuit). To the audio system 24, the microphone 25 and the speaker 26 are connected. To the audio system 24, the sound signal can be input from the processor 11, the microphone 25, or the baseband chip 27. The audio system 24 reads the sound signal recorded in the own unit. The audio system 24 can output the acquired sound signal to the speaker 26 or the processor 11. The sound signal output to the processor 11 can be output to the second communication unit 28 via the baseband chip 27, or to the input device 30 via the wireless communication unit 29. To the input device 30, a drive signal obtained by synthesizing a sound component transmitted in the sound signal and a vibration component transmitted in the vibration signal mentioned above may be input.

The microphone 25 collects sounds coming to the own unit, and outputs a sound signal of the collected sounds to the audio system 24.

The speaker 26 presents sounds based on the sound signal input from the audio system 24.

The baseband chip 27 is a dedicated IC for controlling communication using the second communication unit 28. For example, the baseband chip 27 realizes communication using a public wireless communication system, such as 4G (the 4th generation wireless communication system) or 5G (the 5th generation wireless communication system), a local-area wireless communication network defined in IEEE 802.11, or the like. The baseband chip 27 connects to other devices via a communication network using the second communication unit 28 under the control of the processor 11 in a manner capable of transmitting and receiving various data to and from the other devices to transmit and receive the various data.

The second communication unit 28 is a wireless communication module to connect to the wireless communication network. The second communication unit 28 is equipped with an antenna to transmit and receive radio waves.

The wireless communication unit 29 is a wireless communication module for transmitting and receiving wireless data to and from the input device 30. The wireless communication unit 29 can use, as the communication system, a wireless PAN (Personal Area Network) system, for example, defined in IEEE 802.15.1.

The input device 30 is an operating medium having an elongated shape with the length greater than the diameter. The input device 30 includes the wireless communication unit 31, an MCU 32, a contact detection unit 36, the vibrating unit 55, and the resonant circuit LC1.

The wireless communication unit 31 is a wireless communication module for transmitting and receiving wireless data to and from the wireless communication unit 29 of the information processing apparatus 1.

The MCU (Micro Controller Unit) 32 centrally controls the functionality of the input device 30. The MCU 32 includes a processor, memories such as a ROM and a RAM, and various input/output interfaces. The MCU 32 operates independently of the information processing apparatus 1. The MCU 32 executes a predetermined program to function as the device control unit 50 mentioned above.

The MCU 32 outputs, to the vibrating unit 55, the drive signal input from the information processing apparatus 1 via the wireless communication unit 31.

The vibrating unit 55 includes a DAC 33, an amplifier 34, and a vibration generator 35.

The DAC (Digital-to-Analog Converter) 33 converts a digital drive signal input from the MCU 32 into an analog drive signal. The DAC 33 outputs the converted analog drive signal to the amplifier 34.

The amplifier 34 adjusts the amplitude of the drive signal input from the DAC 33, and outputs, to the vibration generator 35, a drive signal with the amplitude adjusted.

The vibration generator 35 is an actuator that generates vibration according to the drive signal input from the amplifier 34. The vibration generator 35 includes, for example, a piezoelectric vibrator such as a piezo element.

The contact detection unit 36 includes a pressure sensor to detect contact with the own unit. The contact detection unit 36 is placed in a position at a certain distance or more from the vibration generator 35. The frequency band of a pressure detectable by the contact detection unit 36 may be different from the frequency band of the vibration signal. The contact detection unit 36 may determine the presence or absence of contact based on whether or not the detected pressure is a certain value or more. The contact detection unit 36 outputs a contact detection signal indicative of the detection of the detected contact to the information processing apparatus 1 via the MCU 32 and the wireless communication unit 31.

The resonant circuit LC1 is an electric circuit to produce a current that resonates at a constant resonance frequency. The resonant circuit LC1 is constructed, for example, by connecting a coil and a capacitor in series. The resonant circuit LC1 generates a magnetic field with varying polarity at the resonance frequency by an alternating current generated by itself. The generated magnetic field causes the device detection unit 222 of the touch sensor 22 to detect the approach of the input device 30.

Next, a functional configuration example of the information processing system S1 according to the present embodiment will be described.

Figure 4:
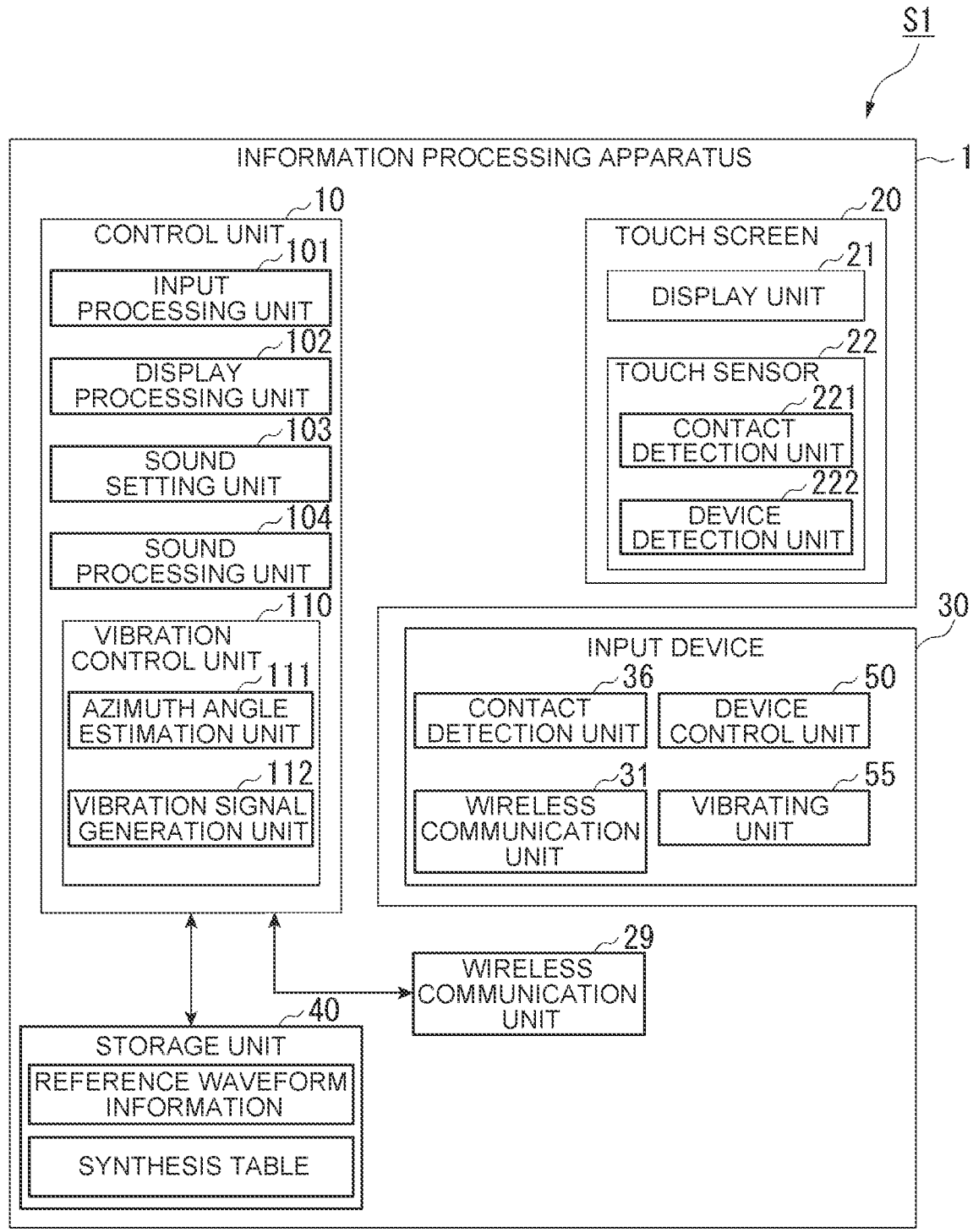
FIG. 4 is a block diagram illustrating an example of the functional configuration of the information processing system according to the present embodiment.

FIG. 4 is a block diagram illustrating the functional configuration example of the information processing system S1 according to the present embodiment. In the example of FIG. 4, differences from FIG. 2 and FIG. 3 will be mainly described. Points common to those in FIG. 2 and FIG. 3 are given common reference numerals and the above description is invoked unless otherwise stated.

The information processing system S1 includes the information processing apparatus 1 and the input device 30.

The information processing apparatus 1 includes the control unit 10, the touch screen 20, the wireless communication unit 29, and a storage unit 40. The storage unit 40 stores various data. The storage unit 40 is, for example, realized by the main memory 12 and the flash memory 13.

The control unit 10 includes an input processing unit 101, the display processing unit 102, the sound setting unit 103, the sound processing unit 104, and the vibration control unit 110.

The input device 30 includes the wireless communication unit 31, the contact detection unit 36, the device control unit 50, and the vibrating unit 55.

The input processing unit 101 controls input from the touch sensor 22. For example, the function of the input processing unit 101 is provided by the execution of a device driver for the touch sensor 22 by the processor 11. The input processing unit 101 outputs, to the vibration control unit 110, input data input from the touch sensor 22 according to OS commands.

The vibration control unit 110 controls the drive mode of the input device 30 as mentioned above.

The vibration control unit 110 may switch the activation of the sound mode sequentially each time the contact detection signal is input from the contact detection unit 36 of the input device 30. For example, in a case where the contact detection signal is input, when the drive mode at the time is the vibration mode, the vibration control unit 110 changes the drive mode from the vibration mode to the sound mode, while when the drive mode at the time is the sound mode, the vibration control unit 110 changes the drive mode from the sound mode to the vibration mode. Thus, the user can switch whether or not to present sound by bringing the input device 30 into contact with any other object.

The user can press the input device 30 against an object, such as a chassis or a rack, as the other object having such a structure as to surround a space with a flat plate to cause the object to resonate sound produced in the input device 30. The resonating sound is emitted by a sufficient volume.

Further, the user can press the input device 30 against the user's head as the other object to propagate the sound produced in the input device 30 to the inside of the head (bone conduction). The propagated sound reaches the inner ears of the user and the user hears it as a bone conduction sound.

The vibration control unit 110 may also read a vibration signal prestored in the storage unit 40, and adjust the amplitude according to the contact pressure or the moving speed of the contact position. Further, the vibration control unit 110 may include an azimuth angle estimation unit 111 and a vibration signal generation unit 112 as illustrated in FIG. 4.

The azimuth angle estimation unit 111 estimates, as the azimuth angle, an angle between the moving direction of the contact position of the input device 30 on the display screen DF and the longitudinal direction of the input device 30 based on input data from the touch sensor 22. For example, the azimuth angle estimation unit 111 can determine, as the moving direction of the input device 30, a direction of displacement from the contact position at the previous time to the contact position at the time. The azimuth angle estimation unit 111 can determine the pen angle indicated in the input data to be a longitudinal orientation of the input device 30 at the time. The azimuth angle estimation unit 111 notifies the determined azimuth angle to the vibration signal generation unit 112.

The vibration signal generation unit 112 generates a vibration signal indicative of a vibration waveform according to the azimuth angle notified from the azimuth angle estimation unit 111. In the storage unit 40, reference waveform information and a synthesis table are prestored. The reference waveform information is information indicative of reference waveforms respectively for predetermined plural reference azimuth angles. Three or more reference azimuth angles just have to be set in an angle range of 0° to 180°. The synthesis table is a data table indicative of a synthesis ratio of each azimuth angle with respect to the reference waveform for each reference azimuth angle.

The vibration signal generation unit 112 refers to the synthesis table to determine the synthesis ratio of the notified azimuth angle for each reference azimuth angle. The vibration signal generation unit 112 can generate, as a vibration signal, a weighted sum of vibration waveforms between reference azimuth angles using the determined synthesis ratio as a weighting factor.

Figure 5:
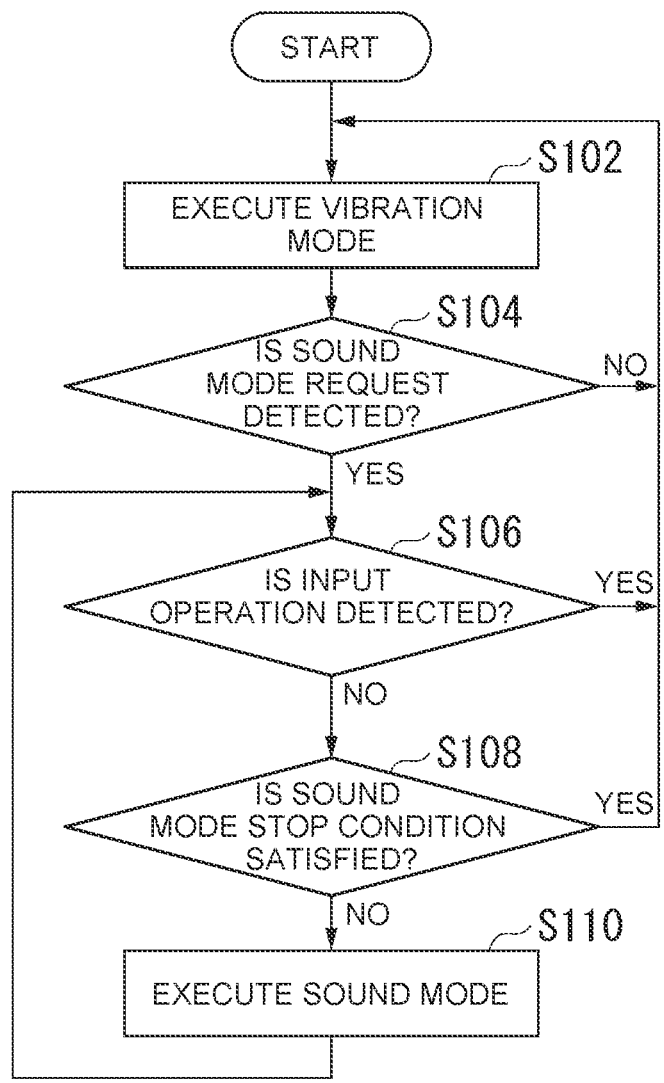
FIG. 5 is a flowchart illustrating an example of a control method of a drive mode according to the present embodiment.

Next, a control method of the drive mode according to the present embodiment will be described. FIG. 5 is a flowchart illustrating an example of the control method of the drive mode according to the present embodiment. Note that in the initial state immediately after the start of the information processing apparatus 1, the drive mode of the input device 30 is set as the vibration mode to vibrate the vibrating unit 55 according to the vibration signal.

(Step S102) The vibration control unit 110 determines the drive mode of the input device 30 to be the vibration mode. The vibration signal is supplied to the vibrating unit 55 of the input device 30 to execute vibration presentation.

(Step S104) The vibration control unit 110 monitors input data from the touch sensor 22, and waits for a sound output request. When the sound output request is detected (YES in step S104), the vibration control unit 110 proceeds to a process in step S106. When the sound output request is not detected (NO in step S104), the vibration control unit 110 returns to the process in step S102.

(Step S106) The vibration control unit 110 waits for input operation transmitted in the input data from touch sensor 22. When input operation is detected (YES in step S106), the vibration control unit 110 returns to step S102. When no input operation is detected (NO in step S106), the vibration control unit 110 proceeds to a process in step S108.

(Step S108) The vibration control unit 110 determines whether or not a sound mode stop condition is satisfied. For example, when no sound signal is input from the sound processing unit 104 continuously for a certain amount of time up to the time or when no input operation is detected, the vibration control unit 110 determines that the sound mode stop condition is satisfied. Otherwise, the vibration control unit 110 can determine that the sound mode stop condition is not satisfied. When the sound mode stop condition is not satisfied (NO in step S108), the vibration control unit 110 proceeds to a process in step S110. When the sound mode stop condition is satisfied (YES in step S108), the vibration control unit 110 returns to the process in step S102.

(Step S110) The vibration control unit 110 determines the drive mode of the input device 30 to be the sound mode. The sound signal is supplied to the vibrating unit 55 of the input device 30 to present sound. After that, the vibration control unit 110 returns to the process in step S106.

In the above example, such a case that the drive mode of the input device 30 is determined exclusively to either one of the sound mode and the vibration mode regarding the determination of the activation of the sound mode is mainly described, but the sound mode may also be applied to overlap with the drive mode. In this case, the vibration control unit 110 may set the vibration mode as the drive mode of the input device 30 always to enabled, determine the application (activation) of the sound mode instead of the change from the vibration mode to the sound mode, and determine the stop (deactivation) of the sound mode instead of the change from the sound mode to the vibration mode.

Figure 6:
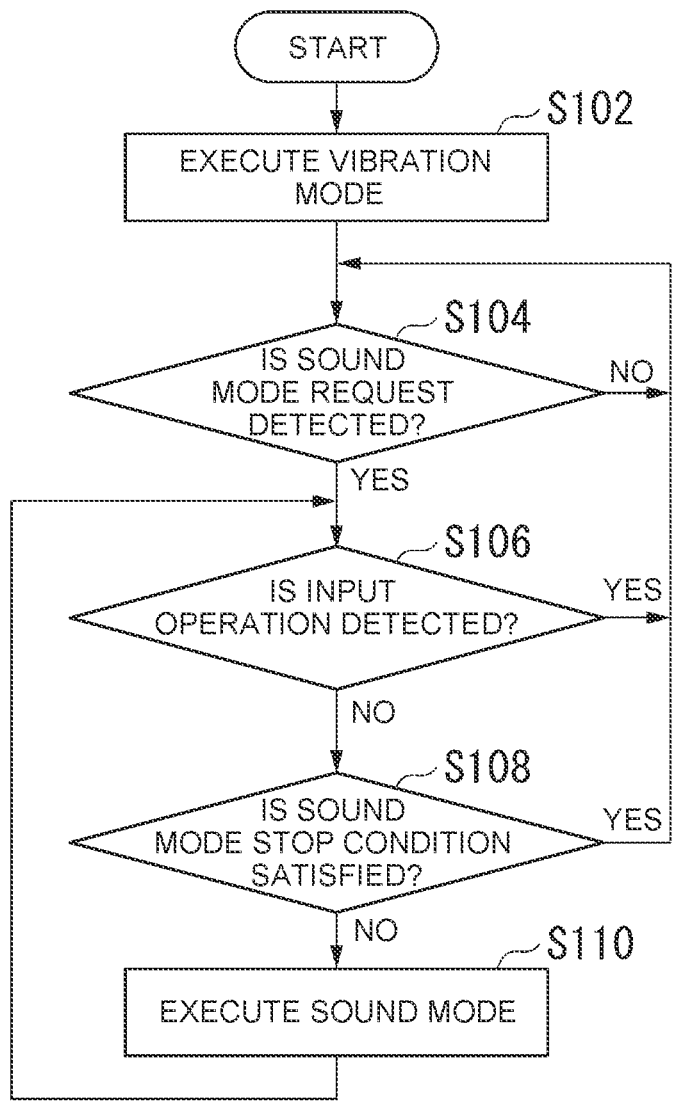
FIG. 6 is a flowchart illustrating another example of the control method of the drive mode according to the present embodiment.

In other words, as illustrated in FIG. 6, when the sound output request is not detected (NO in step S104), when the input operation is detected (YES in step S106), or when the sound mode stop condition is satisfied (YES in step S108), the vibration control unit 110 returns to the process in step S104.

When both the sound mode and the vibration mode are applied, the vibration control unit 110 generates, as the drive signal, a signal obtained by synthesizing the acquired vibration signal and sound signal, and outputs the generated drive signal to the input device 30.

In the above example, such a case that the information processing apparatus 1 includes the vibration signal generation unit 112 to output, to the input device 30, the drive signal based on the vibration signal as illustrated in FIG. 4 is mainly described, but the present invention is not limited to this case. The vibration control unit 110 of the information processing apparatus 1 and the device control unit 50 of the input device 30 may share the processing of the vibration control unit in the information processing system S1 as a whole. In other words, the device control unit 50 may execute all or part of the processing of the vibration control unit 110 mentioned above, and the vibration control unit 110 may not execute the all or part of the processing. However, parameters and other data used in the all or part of the processing are preset, and provided to the device control unit 50 from the information processing apparatus 1.

Figure 7:
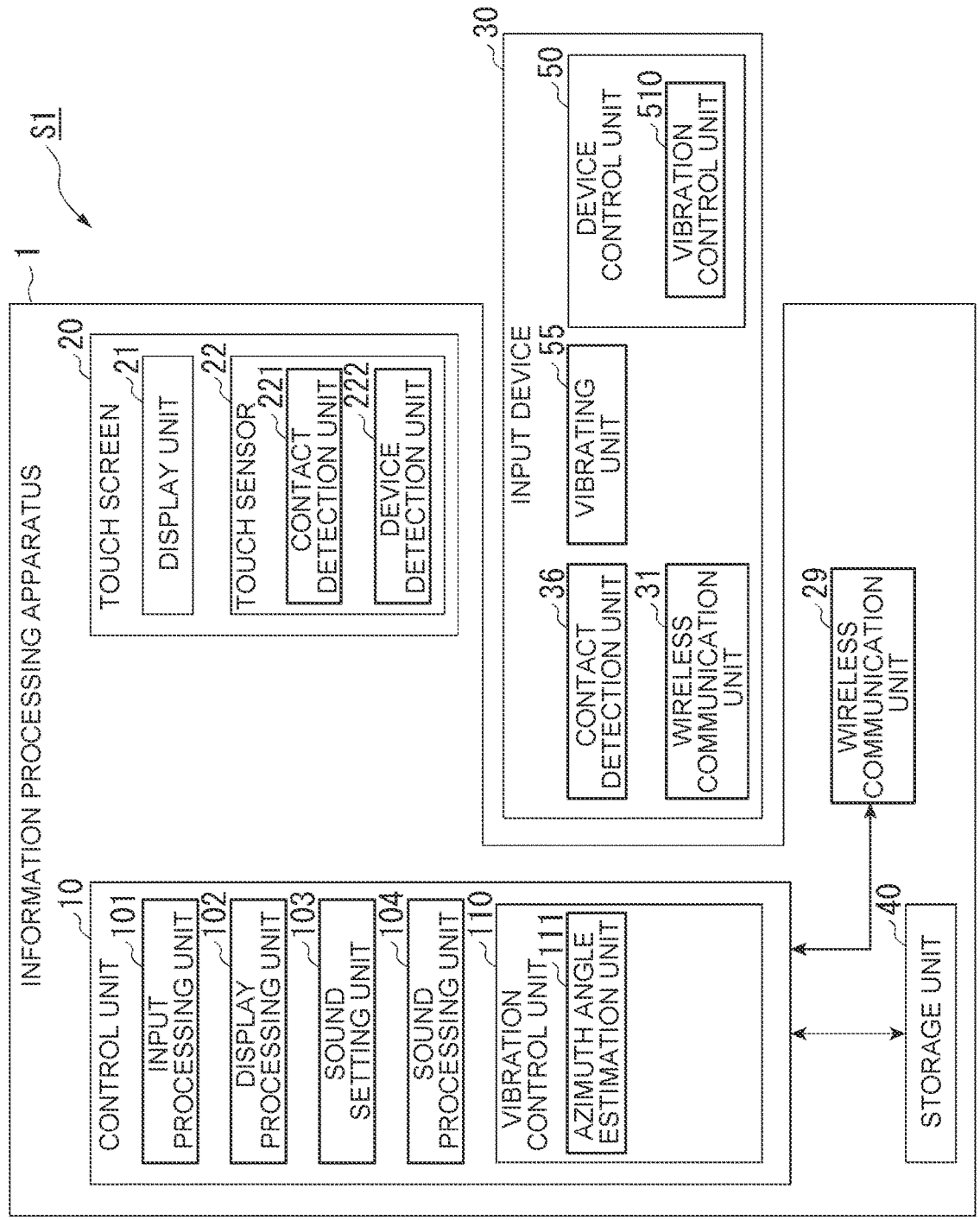
FIG. 7 is a block diagram illustrating another example of the functional configuration of the information processing system according to the present embodiment.

As illustrated in FIG. 7, the device control unit 50 of the input device 30 may also include a vibration control unit 510. The vibration control unit 110 of the information processing apparatus 1 may have the function of the azimuth angle estimation unit 111 and the other function may be omitted. The control unit 10 outputs, to the input device 30, input data input from the touch screen 20 and device control information indicative of the azimuth angle. The vibration control unit 110 may identify either or both of information of the contact position and the contact pressure from the input data input from the touch sensor 22, include the identified information in device control information, and output the device control information. The sound processing unit 104 sets the output destination of the sound signal to the input device 30.

The vibration control unit 510 executes processing similar to the processing executed by the vibration control unit 110 mentioned above. For example, the vibration control unit 510 controls the drive mode of the input device 30 based on input data input from the information processing apparatus 1. The vibration control unit 510 detects the presence or absence of input operation, the sound output request, and the like from the input data as information used to determine the drive mode.

The vibration control unit 510 may switch the activation of the sound mode sequentially each time the contact detection signal is input from the contact detection unit 36, or does not have to output the input contact detection signal to the information processing apparatus 1.

The vibration control unit 510 outputs, to the vibrating unit 55, either one of the vibration signal and the sound signal generated according to the determined drive mode, or a signal synthesized from both of the vibration signal and the sound signal as the drive signal.

In the example of FIG. 7, azimuth angle estimation processing is omitted in the vibration control unit 510. The vibration control unit 510 may refer to reference waveform information and a synthesis table preset in the own unit to generate a vibration signal based on the azimuth angle notified in device control information input from the information processing apparatus 1. Further, the vibration control unit 510 may adjust the amplitude of the generated vibration signal based on the information of either or both of the contact position and the contact pressure identified from the device control information.

In the control unit 10 of the information processing apparatus 1, the azimuth angle estimation unit 111 may be omitted. In this case, the reference waveform information and the synthesis table are set in the vibration control unit 510, and azimuth angle estimation processing is performed based on input data input from the information processing apparatus 1. The vibration control unit 510 uses the obtained azimuth angle to generate the vibration signal.

In the above example, such a case that the information processing apparatus 1 presents sound based on the acquired sound signal is mainly described, but the present invention is not limited to this case. The device control unit 50 may acquire a sound signal without being supplied from the information processing apparatus 1. For example, a sound signal of a set warning sound is preset in the device control unit 50, and when a sound presentation command is input from the control unit 10 of the information processing apparatus 1, the device control unit 50 reads the set sound signal. For example, the sound presentation command can be issued when the malfunction of hardware of the information processing apparatus 1, an abnormality in the operating environment, or any other abnormality occurs. The device control unit 50 can determine the sound presentation command as the sound output request. When activating the sound mode, the device control unit 50 outputs, to the vibrating unit 55, the read sound signal as the drive signal, or a signal obtained by being synthesized with the vibration signal as the drive signal.

Further, in the example mentioned above, the case where the information processing apparatus 1 is a tablet terminal is mainly described, but the present invention is not limited to this case. The information processing apparatus 1 may also be any other form of information communication equipment to perform information input using the touch screen such as a multi-functional mobile phone (including a so-called smartphone), a personal computer, and the like.

As described above, the information processing system S1 according to the present embodiment includes the information processing apparatus 1 and the input device 30. The input device 30 includes the vibrating unit 55. The information processing apparatus 1 includes the touch sensor 22 and the display unit 21 where the touch sensor 22 and the display unit 21 are superimposed on each other. A controller of the information processing apparatus 1 or the input device 30 (for example, the processor 11 of the information processing apparatus 1 or the MCU 32 of the input device 30) monitors input operation of the input device 30 to the touch sensor to control the drive mode of the vibrating unit 55. As drive modes, the information processing system S1 has the sound mode and the vibration mode, where the sound mode is a drive mode for causing the vibrating unit 55 to present sound, and the vibration mode is a drive mode for vibrating the vibrating unit 55 in response to contact of the input device 30 with the touch sensor 22. The controller enables the sound mode when detecting the sound output request, and enables the vibration mode when detecting input operation.

With this configuration, the sound signal is supplied when the vibrating unit 55 for vibrating the input device 30 in response to contact of the input device 30 is requested to present sound. The vibrating unit 55 can present sound based on the supplied sound signal. Therefore, the convenience of the user to listen to the sound when using the input device 30 can be improved.

The controller may also detect the sound setting for the input device 30 as the sound output request.

With this configuration, the sound from the input device 30 can be presented according to user's intent without any special operation.

When no input operation is detected continuously for a certain amount of time or more and no sound signal is supplied to the vibrating unit 55, the controller may disable the sound mode.

With this configuration, when neither input operation nor sound signal is supplied, the sound mode is disabled. Since the vibration mode is applied with priority, the responsiveness to subsequent input operation can be ensured.

When the sound output request is detected without detecting input operation, the controller may enable the sound mode, and when input operation is detected, the controller may disable the sound mode.

With this configuration, the sound presentation in response to the sound output request and the vibration presentation in response to input operation can be switched exclusively. Since the sound and the vibration are not presented at the same time, noise to the sound by a mixture of both and a sense of discomfort against vibration without contact can be avoided.

The input device 30 includes the contact detection unit 36 to detect contact, and when detecting contact, the controller may switch the activation of the sound mode.

With this configuration, the presence or absence of sound presentation is switched by the contact of the input device 30. Therefore, the user can bring the input device 30 into contact with any object other than the input device 30 or the user himself or herself to manipulate the necessity of sound presentation.

While the embodiment of this invention has been described in detail above with reference to the accompanying drawings, the specific configurations are not limited to those in the above-described embodiment, and design changes are included without departing from the scope of this invention. The respective configurations in the embodiment described above can be combined arbitrarily.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS

S1 information processing system
1 information processing apparatus
10 control unit
11 processor
12 main memory
13 flash memory
20 touch screen
21 display unit
22 touch sensor
24 audio system 25 microphone
26 speaker
27 baseband chip
28 second communication unit
29 wireless communication unit
30 input device
31 wireless communication unit
32 MCU
33 DAC
34 amplifier
35 vibration generator
36 contact detection unit
40 storage unit
50 device control unit
55 vibrating unit
101 input processing unit
102 display processing unit
103 sound setting unit
104 sound processing unit
110 vibration control unit
111 azimuth angle estimation unit
112 vibration signal generation unit
221 contact detection unit
222 device detection unit

What is claimed is:

1. An information processing system comprising an information processing apparatus and an input device, where the input device includes a vibrating unit, the information processing apparatus includes a touch sensor and a display unit, and the touch sensor and the display unit are superimposed on each other, wherein
a controller of the information processing apparatus or the input device monitors input operation of the input device to the touch sensor to enable a sound mode when detecting a sound output request, and to enable a vibration mode when detecting the input operation,
the sound mode is a drive mode to cause the vibrating unit to present sound, and
the vibration mode is a drive mode to vibrate the vibrating unit in response to contact of the input device with the touch sensor.

2. The information processing system according to claim 1, wherein the controller detects, as the sound output request, a sound setting for the input device.

3. The information processing system according to claim 1, wherein the controller disables the sound mode when the input operation is not detected continuously for a certain amount of time and when a sound signal is not supplied to the vibrating unit.

4. The information processing system according to claim 1, wherein
the controller enables the sound mode when detecting the sound output request without detecting the input operation, and
the controller disables the sound mode when detecting the input operation.

5. The information processing system according to claim 1, wherein
the input device further includes a contact detection unit to detect contact, and
the controller switches the activation of the sound mode when the contact is detected.

6. An information processing apparatus comprising a controller, a touch sensor, and a display unit, where the touch sensor and the display unit are superimposed on each other, wherein
the controller monitors input operation of an input device to the touch sensor to enable a sound mode when detecting a sound output request, and to enable a vibration mode when detecting the input operation,
the sound mode is a drive mode to cause a vibrating unit of the input device to present sound, and
the vibration mode is a drive mode to vibrate the vibrating unit in response to contact of the input device with the touch sensor.

7. A non-transitory computer-readable recording medium storing a program causing a computer to function as the information processing apparatus according to claim 6.

8. A control method for an information processing system including an information processing apparatus and an input device, where the input device includes a vibrating unit, the information processing apparatus includes a touch sensor and a display unit, and the touch sensor and the display unit are superimposed on each other, the control method comprising:
a step of causing a controller of the information processing apparatus or the input device to monitor input operation of the input device to the touch sensor; and
a step of causing the controller to enable a sound mode when detecting a sound output request, and to enable a vibration mode when detecting the input operation, wherein
the sound mode is a drive mode to cause the vibrating unit to present sound, and
the vibration mode is a drive mode to vibrate the vibrating unit in response to contact of the input device with the touch sensor.

* * * * *